United States Patent Office 3,578,697
Patented May 11, 1971

3,578,697
CHELATING POLYMER
Nelson S. Marans, Silver Spring, Md., assignor to
W. R. Grace & Co., New York, N.Y.
No Drawing. Filed Oct. 10, 1968, Ser. No. 766,645
Int. Cl. C07c 97/02
U.S. Cl. 260—465.4
14 Claims

ABSTRACT OF THE DISCLOSURE

In abstract this invention is directed to a process for preparing a final polymer having the formula

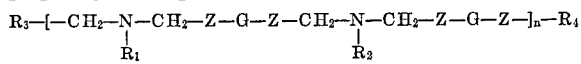

wherein (i) $n$ is 2–4,000; (ii) each of $R_1$ and $R_2$ is separately a member selected from the group consisting of

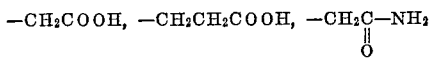

and

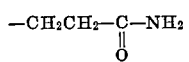

the mole ratio of carboxyl groups to amide groups being about 1:0.1–10; (iii) G is an alkylene group having about 2–12 carbon atoms; (iv) $R_3$ is a member selected from the group consisting of

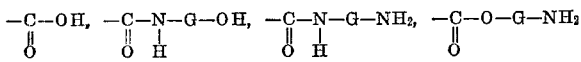

and

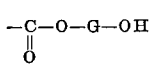

(v) $R_4$ is a member selected from the group consisting of

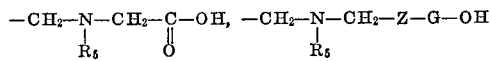

and

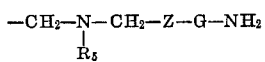

wherein $R_5$ is a member selected from the group consisting of

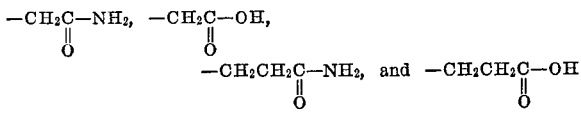

(vi) Z is a member selected from the group consisting of

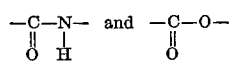

comprising reacting a dihydric alcohol or an amino alcohol, or a diamine with an acid having the formula NC—A—N=(CH$_2$COOH)$_2$ wherein A is an alkylene group having 1–2 carbon atoms to form a first intermediate polymer, treating the first intermediate polymer with hot aqueous alkali to form a second intermediate polymer, and treating the second aqueous polymer with a strong mineral acid to form the final polymer which is recovered, all as recited hereinafter.

BACKGROUND OF THE INVENTION

This invention is in the field of polymers and polymer preparation. The polymers of this invention have a repeating unit of the formula

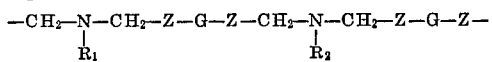

wherein Z is

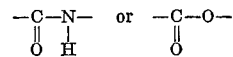

G is an alkylene group having about 2–12 carbon atoms and each of $R_1$ and $R_2$ is separately a member selected from the group consisting of

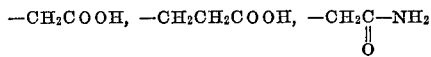

and

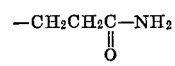

the mole ratio of carboxyl groups to amide groups being about 1:0.1–10.

SUMMARY OF THE INVENTION

In summary, this invention is directed to a process for preparing a final polymer having the formula

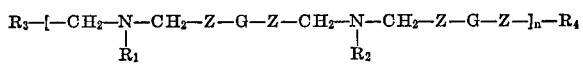

wherein (i) $n$ is 2–4,000; (ii) each of $R_1$ and $R_2$ is separately a radical selected from the group consisting of

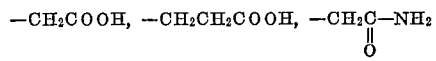

and

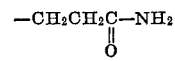

the mole ratio of carboxyl groups to amide groups being about 1:0.1–10; (iii) G is an alkylene (divalent alkyl) group having about 2–12 carbon atoms; (iv) $R_3$ is a member selected from the group consisting of

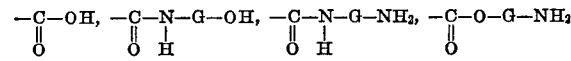

and

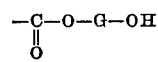

(v) $R_4$ is a member selected from the group consisting of

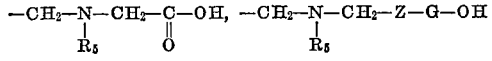

and

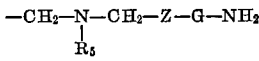

(vi) $R_5$ is a member selected from the group consisting of

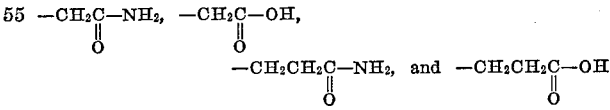

(vii) Z is a member selected from the group consisting of

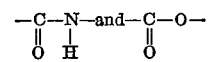

comprising:
(a) forming; (i) a first intermediate polymer (which can be separated from the mixture in which it is found and recovered) having the formula

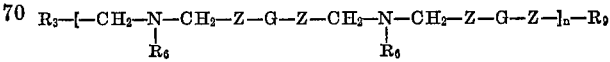

wherein $R_6$ is a member selected from the group consisting of —$CH_2CN$ and —$CH_2CH_2CN$; $R_9$ is a member selected from the group consisting of

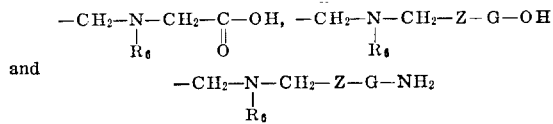

and and (ii) water which is removed substantially as it is formed by reacting at about 110–250° C. a mixture consisting essentially of an inert liquid medium boiling at about 120–260° C. at about 760 millimeters of mercury absolute pressure, a first member selected from a group consisting of NC—$CH_2$—N=$(CH_2CH_2COOH)_2$ and NC—$CH_2CH_2$—N=$(CH_2COOH)_2$, and a second member selected from a group consisting of diols having the formula HO—G—OH, amino alcohols having the formula HO—G—$NH_2$, and diamines having the formula $$H_2N—G—NH_2$$

the mole ratio of the first member to the second member being about 1:0.8–1.1;

(b) forming: (i) a second intermediate polymer (which can be separated from the mixture in which it is found and recovered) having the formula

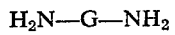

wherein each of $R_7$ and $R_8$ is separately a member selected from the group consisting of

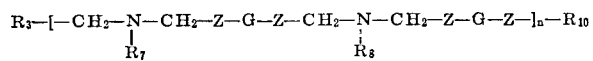

and wherein M is an alkali metal ion, the mole ratio of carboxylate groups to amide groups being about 1:01–10 and $R_{10}$ is a member selected from the group consisting of

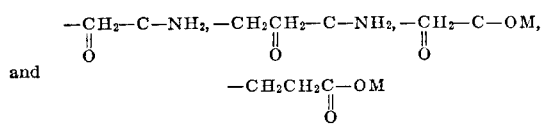

$R_{11}$ is a member selected from the group consisting of

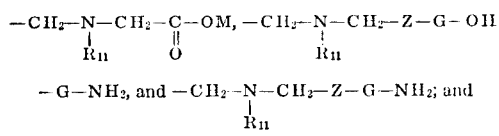

and and (ii) ammonia which is evolved substantially as it is formed by heating (in a vented reactor) a mixture consisting essentially of the first intermediate polymer at about 55–130° C. with an aqueous alkali metal hydroxide being about 1:0.15–0.95 (i.e., the alkali metal hydroxide is added at the rate of about 0.15–0.95 mole per mole of $R_6$);

(c) forming the final polymer and a mother liquor by treating the second intermediate polymer with a strong mineral acid, using about 0.8–1.3 equivalents of acid per mole of alkali metal hydroxide originally added to the first intermediate polymer; and (d) recovering the final polymer, said polymer being an efficient and effective chelating agent for copper ions.

DESCRIPTION OF PREFERRED EMBODIMENTS

In preferred embodiments of the process set forth in the above summary:

(1) The separated final polymer is washed with water until substantially free of mother liquor and dried until substantially free of water before being recovered;

(2) The alkali metal hydroxide is sodium hydroxide;

(3) G is an alkylene group having 2 carbon atoms;

(4) Each of $R_1$ and $R_2$ is separately a radical selected from the group consisting of

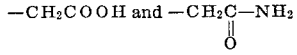

and the mole ratio of carboxyl groups to amide groups is about 1:0.1–10;

(5) $n$ is about 10–2000;

(6) The mixture of inert liquid medium, first member, and second member is heated at about 135–215° C. for about 1–10 hours;

(7) The mixture of first intermediate polymer and aqueous alkali metal hydroxides are heated at about 70–105° C.;

(8) The first intermediate polymer is separated and recovered;

(9) The second intermediate polymer is separated and recovered; and

(10) The first member is $$NC—CH_2—N=(CH_2COOH)_2$$

In another preferred embodiment this invention is directed to a polymer having the formula

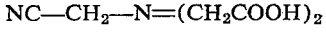

wherein (i) $n$ is 2–4,000; (ii) each of $R_1$ and $R_2$ is separately a radical selected from the group consisting of

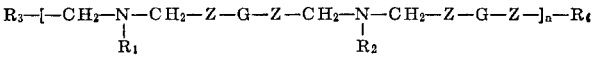

the mole ratio of carboxyl groups to amide groups being about 1:0.1–10; (iii) G is an alkylene group having about 2–12 carbon atoms; (iv) $R_3$ is a member selected from the group consisting of

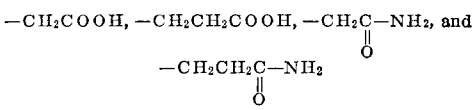

(v) $R_4$ is a member selected from the group consisting of

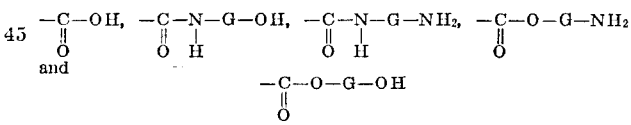

(vi) Z is a member selected from the group consisting of

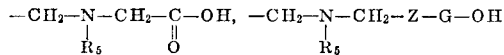

In another preferred embodiment this invention is directed to a polymer having the formula

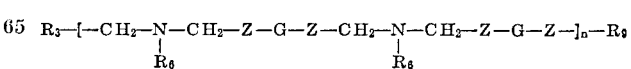

wherein $R_3$ is a member selected from the group consisting of

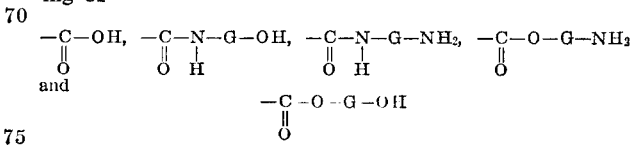

$R_6$ is a member selected from the group consisting of —$CH_2CN$ and —$CH_2CH_2CN$; $R_9$ is a member selected from the group consisting of $$-CH_2-N-CH_2-C-OH, \quad -CH_2-N-CH_2-Z-G-OH$$
$$\underset{R_6}{|} \quad \underset{O}{\|} \qquad \underset{R_6}{|}$$

and $$-CH_2-N-CH_2-Z-G-NH_2$$
$$\underset{R_6}{|}$$

G is an alkylene group having 2–12 carbon atoms; Z is a member selected from the group consisting of $$-C-N- \quad \text{and} \quad -C-O-$$
$$\underset{O}{\|}\underset{H}{|} \qquad \underset{O}{\|}$$

and $n$ is 2–4000.

In another preferred embodiment the invention is directed to a polymer having the formula $$R_3-[-CH_2-N-CH_2-Z-G-Z-CH_2-N-CH_2-Z-G-Z-]_n-R_{10}$$
$$\underset{R_7}{|} \qquad\qquad\qquad \underset{R_8}{|}$$

wherein $R_3$ is a member selected from the group consisting of $$-C-OH, \quad -C-N-G-OH, \quad -C-N-G-NH_2, \quad -C-O-G-NH_2$$
$$\underset{O}{\|} \quad \underset{O}{\|}\underset{H}{|} \qquad \underset{O}{\|}\underset{H}{|} \qquad \underset{O}{\|}$$

and $$-C-O-G-OH$$
$$\underset{O}{\|}$$

wherein each of $R_7$ and $R_8$ is separately a member selected from the group consisting of $$-CH_2-C-NH_2, \quad -CH_2CH_2-C-NH_2, \quad -CH_2-C-OM, \quad \text{and}$$
$$\underset{O}{\|} \qquad \underset{O}{\|} \qquad \underset{O}{\|}$$

$$-CH_2CH_2C-OM$$
$$\underset{O}{\|}$$

wherein M is an alkali metal ion, the mole ratio of carboxylate groups to amide groups being about 1:0.1–10; and $R_{10}$ is a member selected from the group consisting of $$-CH_2-N-CH_2-C-OM, \quad -CH_2-N-CH_2-Z-G-OH,$$
$$\underset{R_{11}}{|} \quad \underset{O}{\|} \qquad \underset{R_{11}}{|}$$

$$-CH_2CH_2C-OM, \quad -G-NH_2, \quad \text{and} \quad -G-OH; \text{ and}$$
$$\underset{O}{\|}$$

G is an alkylene group having about 2–12 carbon atoms; and Z is a member selected from the group consisting of $$-C-N- \quad \text{and} \quad -C-O-$$
$$\underset{O}{\|}\underset{H}{|} \qquad \underset{O}{\|}$$

$n$ is 2–400; and $R_{11}$ is a member selected from the group consisting of $$-CH_2-C-NH_2, \quad -CH_2CH_2-C-NH_2, \quad -CH_2-C-OM, \quad \text{and}$$
$$\underset{O}{\|} \qquad \underset{O}{\|} \qquad \underset{O}{\|}$$

$$-CH_2CH_2C-OM$$
$$\underset{O}{\|}$$

DETAILED DESCRIPTION OF THE INVENTION

As stated supra the polymers of this invention are prepared by reacting in an inert liquid medium (or inert solvent) boiling at about 120–260° C. at 760 millimeters of mercury absolute pressure a reacting mixture consisting essentially of (a) an acid having the formula $$NC-CH_2-N=(CH_2COOH)_2$$

or $NC-CH_2CH_2-N=(CH_2COOH)_2$ and (b) an alcohol having the formula $HO-G-OH$, or an amino alcohol having the formula $HO-G-NH_2$, or a diamine having the formula $H_2N-G-NH_2$, to form water and a first intermediate polymer having the formula $$R_3-[-CH_2-N-CH_2-Z-G-Z-CH_2-N-CH_2-Z-G-Z-]_n-R_9$$
$$\underset{R_6}{|} \qquad\qquad\qquad \underset{R_6}{|}$$

wherein G, Z, $R_3$, $R_6$, $R_9$, and $n$ are as defined supra.

Water is removed from the reactive mixture continuously and substantially as it (the water) is formed. A preferred method for removing the water comprises using as inert liquid medium an inert solvent such as xylene, ethylbenzene, or the like in which water is substantially insoluble and refluxing the mixture of inert solvent and reacting mixture while condensing the vapors and collecting the resulting condensate in a water separating trap (e.g., a Dean-Stark trap or a Barrett trap, or the like), wherein the water is separated from the inert solvent, and returning the substantially water-free inert solvent to the refluxing reacting mixture.

Other methods for removing water substantially as it is formed will be readily apparent to those skilled in the art. One such method comprises continuously withdrawing a slip, or side, stream of liquid from the heated (e.g., refluxing) mixture, removing any insoluble material from the slip stream and returning such materials to the refluxing mixture, contacting the slip stream with a desiccant or a water adsorbing material (preferably after cooling the slip stream) such as silica gel or alumina gel to remove water from the inert solvent component of the slip stream and returning the thus contacted and now substantially water-free liquid to the reacting mixture.

When the reaction is completed or substantially completed (as determined by any convenient means, e.g., by elimination (separation) of the theoretical quantity of water or by analysis of a sample of the reacting mixture), the thus formed first intermediate polymer can be separated from the liquid medium preferably by distilling or vaporizing the medium from said polymer and more preferably by conducting the distillation under reduced pressure, the thus separated first intermediate polymer can be recovered (if desired it can be dried, i.e., substantially freed of inert liquid medium before being recovered), or it can be treated with an aqueous solution of an alkali metal hydroxide (e.g., sodium hydroxide, potassium hydroxide, or lithium hydroxide) to yield a second intermediate polymer having the formula $$R_3-[-CH_2-N-CH_2-Z-G-Z-CH_2-N-CH_2-Z-G-Z-]_n-R_{10}$$
$$\underset{R_7}{|} \qquad\qquad\qquad \underset{R_8}{|}$$

wherein $R_3$, $R_7$, $R_8$, $R_{10}$, Z, G, and M are as defined supra and wherein the ratio of carboxylate groups to amide groups is about 1:0.1–10.

The ratio of —$CH_2COOM$ to $$-CH_2\overset{O}{\underset{\|}{C}}-NH_2$$

(or —$CH_2CH_2COOM$ to —$CH_2CH_2C-NH_2$) groups can be controlled by controlling the quantity of alkali metal hydroxide used in the hydrolysis of the nitrile (—CN) groups of the first intermediate polymer. If a half mole of alkali metal hydroxide is used for each mole of —CN present in the first intermediate polymer, the mole ratio of $$-CH_2COOM \text{ to } CH_2\overset{O}{\underset{\|}{C}}-NH_2$$

(or —$CH_2CH_2COOM$ to —$CH_2CH_2\overset{O}{\underset{\|}{C}}-NH_2$)

groups in the resulting second intermediate polymer will be about 1:1. If a quarter mole of alkali metal hydroxide is used for each mole of —CN present in the first intermediate polymer said ratio (in the second intermediate polymer) will be about 1:3, and if ¾ mole of alkali metal hydroxide is used for each mole of —CN in the first intermediate polymer said ratio will be about 3:1. In other words, a mole of alkali metal hydroxide will convert a mole (i.e., 26 grams) of —CN to about a mole of —COOM (i.e., ca. 67 grams where M is sodium), with the remainder of the —CN in excess of 1 mole for each mole of alkali metal hydroxide being converted to $$-\overset{O}{\underset{\|}{C}}-NH_2$$

The thus formed second intermediate polymer can be separated from the water in which it (the second intermediate polymer) was formed, preferably by decantation, filtration, or centrifugation. Alternatively the separation can be accomplished by distilling or vaporizing the water from the second intermediate polymer. Such distillation or vaporization is preferably conducted under reduced pressure. The separated second intermediate polymer can be recovered. If desired, it can be washed and dried before being recovered.

Alternatively the second intermediate polymer can (without being separated from the liquor in which it was formed) be treated with a strong mineral acid to convert said polymer to a final polymer having the formula

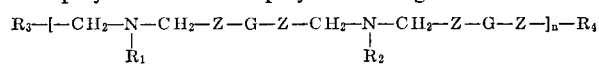

wherein $R_1$, $R_2$, $R_3$, $R_4$, Z, G and $n$ are as defined supra, the mole ratio of carboxyl groups to amide groups being about 1:0–10.

Where preparing the final polymer from the second intermediate polymer it is not necessary to separate the second intermediate polymer from the water in which said intermediate polymer was formed. The mineral acid can be added to the mixture in which said intermediate polymer was formed without separating the intermediate polymer therefrom. Alternatively, if the second intermediate polymer is separated from the water in which said intermediate polymer was formed, the separated intermediate polymer can be added to water before treating with mineral acid (to form the final polymer) or an aqueous solution of mineral acid can be mixed with the separated second intermediate polymer.

The thus formed final polymer is separated from the aqueous solution in which it (the final polymer) was formed and recovered. The final polymer can be separated from the aqueous liquor in which it was formed by such methods as decantation, filtration, and centrifugation. If desired, the separated final polymer can be washed until free or substantially free of mineral acid. Also, if desired the separated final polymer can be dried—preferably after washing.

The following examples are set forth by way of illustration, and it is understood that the instant invention is not to be construed as being limited by said examples or by the details therein.

EXAMPLE I

A mixture of 17.2 grams of cyanomethyliminodiacetic acid and 6.2 grams of ethylene glycol was heated in a round bottomed flask at about 138° C. for about 6 hours in 100 milliliters of xylene. A reflux condenser and Dean-Stark trap were attached to the flask to condense and collect vapor formed by the heating. Water separated from the xylene in the trap in the well known manner, and the resulting substantially water-free xylene was recycled to the round bottom flask.

After the theoretical amount of water (3.6 grams) had been collected, the xylene was distilled from the flask at about 70° C. under reduced pressure. The separated product (first intermediate polymer) was heated at about 100° C. with a solution of about 2.2 grams of sodium hydroxide in 50 milliliters of water until the evolution of ammonia ceased (i.e., ca. 3 hours heating). (In another run the separated first intermediate polymer was recovered.) The thus formed second intermediate polymer was treated without separating from the aqueous liquor in which it was formed with about 4 milliliters of concentrated (ca. 98%) sulfuric acid. (In another replication of this run the second intermediate polymer was separated from the liquor in which it was formed.) The acidic mixture was stirred for about 10 minutes and the resulting final polymer was separated from the acidic liquor by centrifugation.

The separated final polymer was washed with water until substantially free of mother liquor and recovered.

The recovered final polymer was found to be an excellent chelating agent for copper (II) ions excellently adapted for removing copper (II) ions from aqueous solutions thereof. Chelates of said final polymer with copper (II) ions were also found to be an excellent "slow release" source of copper (II) ions excellently adapted to supply copper (II) ions to soil which is deficient in copper.

EXAMPLE II

The general procedure of Example I was repeated. However, in this instance the 2.2 grams of sodium hydroxide was replaced with 3.1 grams of potassium hydroxide, and the second intermediate polymer was recovered by filtration.

The recovered second intermediate polymer was found to be an excellent chelating agent for copper (II) ions excellently adapted for removing such ions from aqueous solution thereof. Copper chelates of the recovered second intermediate polymer were found to be an excellent "slow release" source of copper (II) ions excellently adapted to supply such ions to soil which is deficient in copper.

EXAMPLE III

The general procedure of Example I was repeated; however, in this instance the ethylene glycol was replaced with monoethanolamine. The results were substantially identical to those of the run reported in Example I, except that in the product of the instant run substantially half of the "Z's" were amide groups and half of the "Z's" were ester groups while in Example I all of the "Z's" were ester groups.

EXAMPLE IV

The general procedure of Example I was repeated; however, in this instance the ethylene glycol was replaced with ethylenediamine. The results were substantially identical to those of the run reported in Example I, except that in the instant run the "Z's" were amide groups rather than ester groups.

I have also found that in another embodiment of this invention the polymers of said invention can be formed by heating a mixture of the above-named reactants in the mole ratios specified supra at about 160–250° C. for the times specified supra in the absence of an inert liquid medium of the type discussed supra. Water is vaporized from the solvent (inert liquid medium)-free system substantially as it (the water) is formed.

Inert liquid media which are operative in the process of this invention include but are not limited to xylene, ethylbenzene, propylbenzene, chlorobenzene, 1,2,3,4-tetrahydronaphthalene, tetramethylbenzene, butylbenzene, octyl chloride, decyl chloride, and 4-methylbenzyl chloride. As a result of my disclosure still other inert media will be readily apparent to those skilled in the art.

Strong mineral acids which are operative in the process of this invention include sulfuric acid, hydrochloric acid, orthophosphoric acid, and pyrophosphoric acid. Still other strong mineral acids will be readily apparent to those skilled in the art.

Dihydric alcohols (alkylene diols) which are operable in the process of this invention include, but are not limited to; (a) ethylene glycol, the propylene glycols, the butylene glycols, the pentane diols, and the hexane diols; (b) HO—$CH_2(CH_2)_nCH_2$—OH, wherein $n$ is about 5–10 and the isomers thereof including

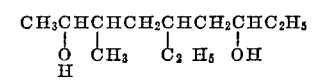

and

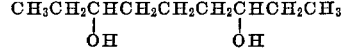

Amino alcohols which are operable in the process of this invention include, but are not limited to; (a) monoethanolamine, the monopropanolamines, the monobutanolamines, the monopentanolamines, the monooctanolamines; and (b) HO—CH$_2$(CH$_2$)$_n$CH$_2$—NH$_2$ where $n$ is about 7–10 and the isomers thereof.

Diamines which are operable in the process of this invention include, but are not limited to; (a) ethylenediamine, the propylenediamines, the butylenediamines, diaminopentanes, the diaminohexanes, the diaminoheptanes, the diaminooctanes; and (b)

H$_2$N—CH$_2$(CH$_2$)$_n$CH$_2$—NH$_2$ where $n$ is about 7–10 and the isomers thereof.

As used herein, the term "percent (%)" means parts per hundred by weight, unless otherwise defined where used, and the term "parts" means parts by weight unless otherwise defined where used.

I claim:
1. A process for preparing a final polymer having the formula

$$R_3-[-CH_2-N-CH_2-Z-G-Z-CH_2-N-CH_2-Z-G-Z-]_n-R_4$$
$$\quad\quad\quad\quad |\quad\quad\quad\quad\quad\quad\quad\quad |$$
$$\quad\quad\quad\quad R_1\quad\quad\quad\quad\quad\quad\quad\quad R_2$$

wherein (i) $n$ is 2–4,000; (ii) each of $R_1$ and $R_2$ is separately a radical selected from the group consisting of —CH$_2$COOH, —CH$_2$CH$_2$COOH, —CH$_2$C(=O)—NH$_2$, and

—CH$_2$CH$_2$C(=O)—NH$_2$ the mole ratio of carboxyl groups to amide groups being about 1:0.1–10; (iii) G is an alkylene group having about 2–12 carbon atoms; (iv) R$_3$ is a member selected from the group consisting of —C(=O)—OH, —C(=O)—N(H)—G—OH, —C(=O)—N(H)—G—NH$_2$, —C(=O)—O—G—NH$_2$ and
—C(=O)—O—G—OH (v) R$_4$ is a member selected from the group consisting of

—CH$_2$—N(R$_5$)—CH$_2$—C(=O)—OH, —CH$_2$—N(R$_5$)—CH$_2$—Z—G—OH and

—CH$_2$—N(R$_5$)—CH$_2$—Z—G—NH$_2$ (vi) R$_5$ is a member selected from the group consisting of —CH$_2$C(=O)—NH$_2$, —CH$_2$C(=O)—OH, —CH$_2$CH$_2$—C(=O)—NH$_2$, and

—CH$_2$CH$_2$C(=O)—OH (vii) Z is a member selected from the group consisting of

—C(=O)—N(H)— and —C(=O)—O— comprising
(a) forming; (i) a first intermediate polymer having the formula $$R_3-[-CH_2-N-CH_2-Z-G-Z-CH_2-N-CH_2-Z-G-Z-]_n-R_9$$
$$\quad\quad\quad\quad |\quad\quad\quad\quad\quad\quad\quad\quad |$$
$$\quad\quad\quad\quad R_6\quad\quad\quad\quad\quad\quad\quad\quad R_6$$

wherein R$_6$ is a member consisting of —CH$_2$CN and —CH$_2$CH$_2$CN; R$_9$ is a member selected from the group consisting of —CH$_2$—N(R$_6$)—CH$_2$—C(=O)—OH, —CH$_2$—N(R$_6$)—CH$_2$—Z—G—OH, and
—CH$_2$—N(R$_6$)—CH$_2$—Z—G—NH$_2$ and (ii) water which is removed substantially as it is formed by reacting at about 110–250° C. a mixture consisting essentially of an inert liquid medium boiling at about 120–260° C. at about 760 millimeters of mercury absolute pressure, a first member selected from a group consisting of

NC—CH$_2$—N=(CH$_2$CH$_2$COOH)$_2$ and NC—CH$_2$CH$_2$—N=(CH$_2$COOH)$_2$, and a second member selected from a group consisting of diols having the formula HO—G—OH, amino alcohols having the formula HO—G—NH$_2$, and diamines having the formula H$_2$N—G—NH$_2$, the mole ratio of the first member to the second member being about 1:0.8–1.1;

(b) forming; (i) a second intermediate polymer having the formula $$R_3-[-CH_2-N-CH_2-Z-G-Z-CH_2-N-CH_2-Z-G-Z-]_n-R_{10}$$
$$\quad\quad\quad\quad |\quad\quad\quad\quad\quad\quad\quad\quad |$$
$$\quad\quad\quad\quad R_7\quad\quad\quad\quad\quad\quad\quad\quad R_8$$

wherein each of R$_7$ and R$_8$ is seperately a member selected from the group consisting of —CH$_2$—C(=O)—NH$_2$, —CH$_2$CH$_2$—C(=O)—NH$_2$, —CH$_2$—C(=O)—OM, and

—CH$_2$CH$_2$C(=O)—OM wherein M is an alkali metal ion, the mole ratio of carboxylate groups to amide groups being about 1:0.1; R$_{10}$, and is a member selected from the group consisting of —CH$_2$—N(R$_{11}$)—CH$_2$—C(=O)—OM, —CH$_2$—N(R$_{11}$)—CH$_2$—Z—G—OH,
—G—NH$_2$—G—OH and —CH$_2$—N(R$_{11}$)—CH$_2$—Z—G—NH$_2$ and R$_{11}$ is a member selected from the group consisting of —CH$_2$C(=O)—NH$_2$, —CH$_2$C(=O)—OM, —CH$_2$CH$_2$C(=O)—NH$_2$, and

—CH$_2$CH$_2$C(=O)—OM and (ii) ammonia which is evolved substantially as it is formed by heating a mixture consisting essentially of the first intermediate polymer at about 55–130° C. with an aqueous alkali metal hydroxide being about 1:0.15–0.95;

(c) forming the final polymer and a mother liquor by treating the second intermediate polymer with a strong mineral acid, using about 0.8–1.3 equivalents of acid per mole of alkali metal hydroxide originally added to the first intermediate polymer; and (d) recovering the final polymer.

2. The process of claim 1 wherein the separated final polymer is washed with water until substantially free of mother liquor and dried until substantially free of water before being recovered.

3. The process of claim 1, wherein the alkali metal hydroxide is sodium hydroxide.

4. The process of claim 1, wherein G is an alkylene group having 2 carbon atoms.

5. The process of claim 1, wherein each of R$_1$ and R$_2$ is separately a radical selected from the group consisting of —CH$_2$COOH and —CH$_2$C(=O)—NH$_2$ and the mole ratio of carboxyl groups to amide groups is about 1:0.1–10.

6. The process of claim 1, wherein $n$ is about 10–2000.

7. The process of claim 1, wherein the mixture of inert liquid medium, first member is heated at about 135–215° C. for about 1–10 hours.

8. The process of claim 1, wherein the mixture of first intermediate polymer and aqueous alkali metal hydroxides are heated at about 70–105° C.

9. The process of claim 1, wherein first intermediate polymer is separated and recovered.

10. The process of claim 1, wherein the second intermediate polymer is separated and recovered.

11. The process of claim 1, wherein the first member is NC—CH$_2$—N=(CH$_2$COOH)$_2$.

12. A polymer having the formula

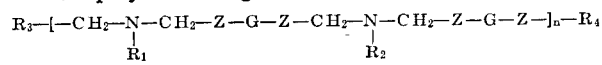

wherein (i) $n$ is 2–4,000, (ii) each of $R_1$ and $R_2$ separately a radical selected from the group consisting of

—CH$_2$COOH, —CH$_2$CH$_2$COOH, —CH$_2$C(O)—NH$_2$, and —CH$_2$CH$_2$C(O)—NH$_2$ the mole ratio of carboxyl groups to amide groups being about 1:0.1–10; (iii) G is an alkylene group having about 2–12 carbon atoms; (iv) $R_3$ is a member selected from the group consisting of

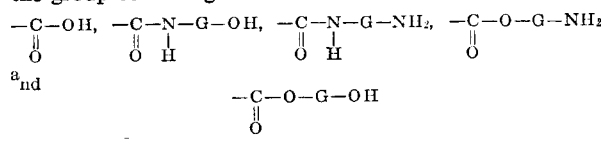

and

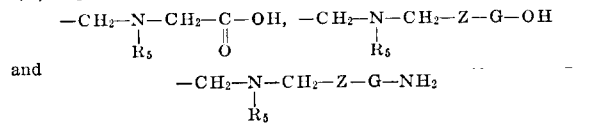

(v) $R_4$ is a member selected from the group consisting of

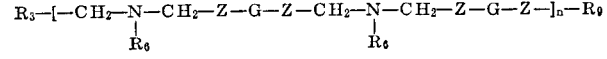

and

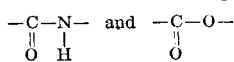

(vi) Z is a member selected from the group consisting of

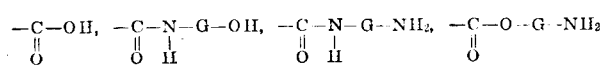

13. A polymer having the formula

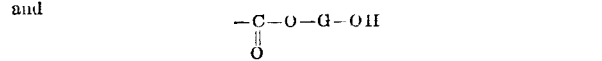

wherein $R_3$ is a member selected from the group consisting of

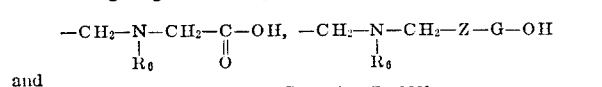

and

—C—O—G—OH
‖
O $R_6$ is a member selected from the group consisting of —CH$_2$CN and —CH$_2$CH$_2$CN; $R_9$ is a member selected from the group consisting of

—CH$_2$—N(R$_6$)—CH$_2$—C(O)—OH, —CH$_2$—N(R$_6$)—CH$_2$—Z—G—OH and

—CH$_2$—N(R$_6$)—CH$_2$—Z—G—NH$_2$ and $n$ is 2–4000; G is an alkylene group having 2–12 carbon atoms; Z is a member selected from the group consisting of

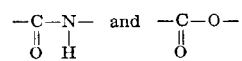

14. A polymer having the formula

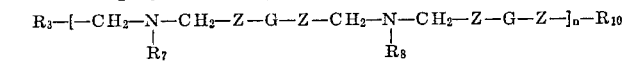

wherein $R_3$ is a member selected from the group consisting of

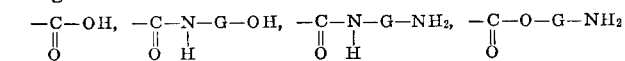

and

wherein each of $R_7$ and $R_8$ is separately a member selected from the group consisting of

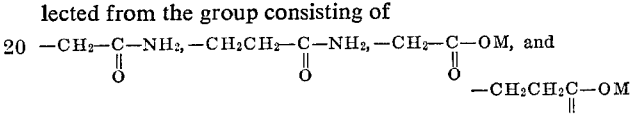

wherein M is an alkali metal ion, the mole ratio of carboxylate groups to amide groups being about 1:0.1–10; and $R_{10}$ is a member selected from the group consisting of

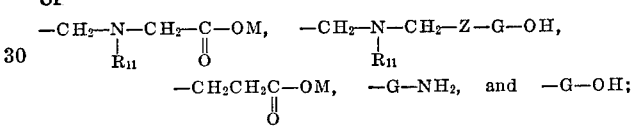

—CH$_2$CH$_2$C(O)—OM, —G—NH$_2$, and —G—OH;

G is an alkylene group having about 2–12 carbon atoms; and Z is a member selected from the group consisting of

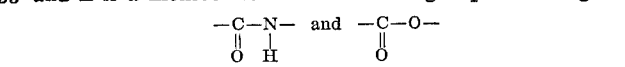

$n$ is 2–4000; and $R_{11}$ is a member selected from the group consisting of

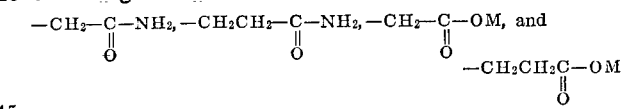

References Cited

UNITED STATES PATENTS

| | | | |
|---|---|---|---|
| 2,458,421 | 1/1949 | Reynolds et al. | 260—482X |
| 2,744,086 | 5/1956 | Mowry et al. | 260—482 X |
| 3,341,573 | 9/1967 | Shibe, Jr. | 260—482 |

LEWIS GOTTS, Primary Examiner

P. J. KILLOS, Assistant Examiner

U.S. Cl. X.R.

71—97; 252—184; 260—404.5, 438.1R, 482P, 534M, 561A